United States Patent [19]
Hird

[11] Patent Number: 4,867,022
[45] Date of Patent: Sep. 19, 1989

[54] RACK PROCESSOR

[76] Inventor: Edwin A. Hird, 10200 DeSoto Ave. #331, Chatsworth, Calif. 91311

[21] Appl. No.: 83,803

[22] Filed: Aug. 11, 1987

Related U.S. Application Data

[62] Division of Ser. No. 392,342, Jun. 25, 1982.

[51] Int. Cl.$^4$ .............................................. B26D 7/14
[52] U.S. Cl. ......................................... 83/176; 83/214; 83/419; 83/456; 83/465; 83/529; 83/549; 83/618; 83/627
[58] Field of Search ................. 83/176, 213, 214, 549, 83/550, 618, 622, 529, 420, 421, 449, 240, 248, 268, 456, 458, 465, 627, 628, 382, 451, 464, 466, 20, 21

[56] References Cited

U.S. PATENT DOCUMENTS

| | | | |
|---|---|---|---|
| 143,023 | 9/1873 | McWilliams | 83/529 |
| 162,750 | 5/1875 | Holmes | 83/176 |
| 549,670 | 11/1895 | Housem | 83/549 |
| 1,049,676 | 1/1913 | Cousins et al. | 83/549 X |
| 1,746,043 | 2/1930 | Maguire | 83/176 |
| 1,866,711 | 7/1932 | Jones | 83/176 X |
| 2,396,814 | 3/1946 | Besag | 83/529 |
| 2,466,436 | 4/1949 | Jones | 83/228 |
| 3,771,396 | 11/1973 | Im | 83/214 X |
| 3,913,433 | 10/1975 | Matthews | 83/451 X |

Primary Examiner—Frank T. Yost
Assistant Examiner—Eugenia A. Jones

[57] ABSTRACT

A device for producing perforations in a flexible rack. With mechanical drive systems a "rack" is a linear element used with a rotary element whereby linear and rotary motions are displaced. The flexible rack processed by this invention consists of a tape having a cross-sectional curvature. It is thin, rigidly straight, resilient and used for "interconverting" (mutually converting or equally displacing) linear and rotary motions. A method is taught for perforating a rack along its length. Perforations are produced whil the rack is bent radially and flattened laterally corresponding to a position with which the rack will be used when "interconverting linear and rotary motions."

2 Claims, 1 Drawing Sheet

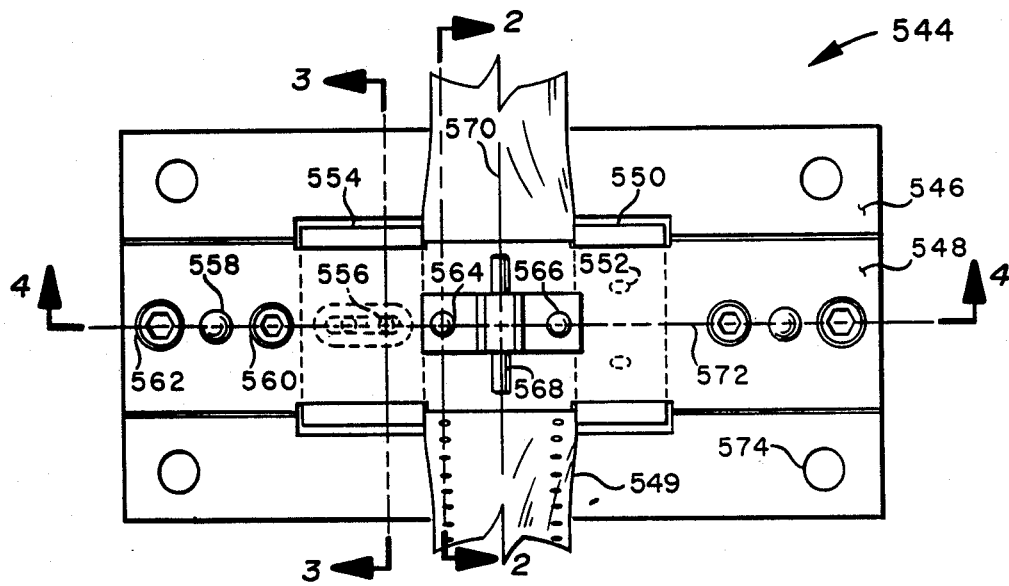
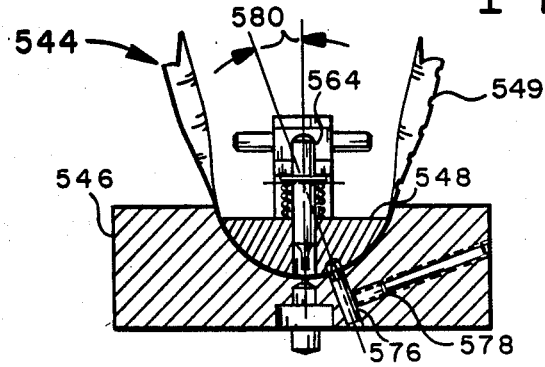
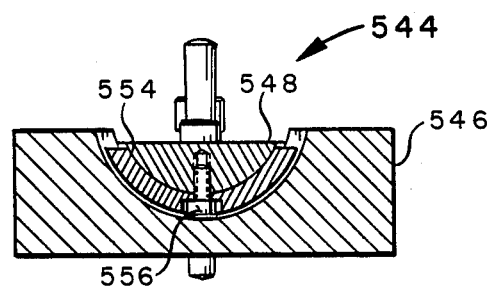
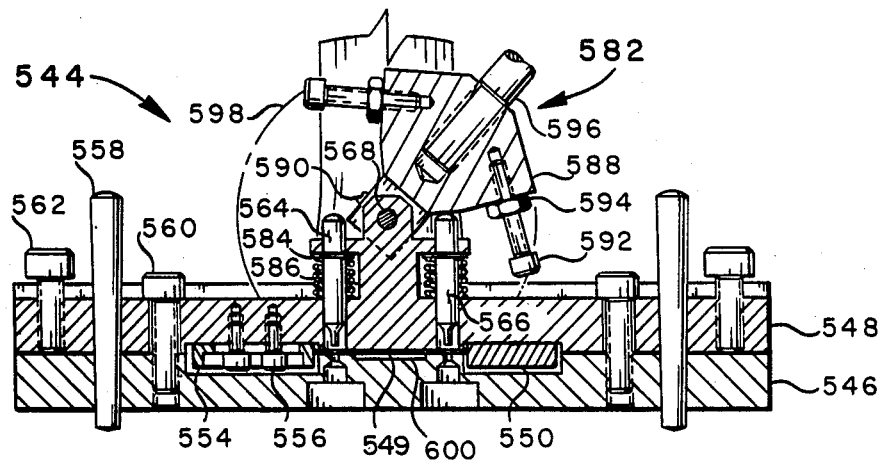

RACK PROCESSOR

This is a division of application Ser. No. 06/392,342, filed June 25, 1982, for A Measurement Digitizer.

The Rack Processor is a device for producing perforations in a flexible rack. With mechanical drive systems a rack is a linear element that interacts with a rotary element whereby linear and rotary motions are displaced. The rack taught herein may somewhat be compared with a rack of a rack and pinion in that each is used when displacing linear and rotary motions. However, with a rack and pinion backlash is inherent whereby linear and rotary motions are "converted." In contrast, with the rack processed by this invention backlash may be eliminated whereby linear and rotary motions may be "interconverted" (mutually converted or equally displaced) as taught with my application Ser. No. 06/392,342.

BACKGROUND

To produce perforations in the rack its characteristics and use must be taken into consideration. A flexible, perforated rack consists of a tape having a cross-sectional curvature and having perforations along its length. It is thin, rigidly straight, resilient and usually made of metal. However, it may be made of plastic. Although thin is possesses considerable strength and rigidity being cross-sectionally curved. When used it is usually bent toward its convex surface about a coupling aligned with sprockets worn and mated with the rack perforations.

Since the rack will flatten laterally where it is bent radially, it may be visualized that its perforations must be produced while it is bent from its natural cross-sectionally curved position and corresponding to its being bent about the coupling. For example, if perforations are produced in a rack while it is straight and cross-sectionally curved, the shape of the perforations will change both longitudinally and transversely when the rack is bent radially and flattened laterally. Since the perforations are eventually worn with sprockets while the rack is bent thus flattened laterally, attempts to perforate the rack while in its straight and cross sectionally curved position, with possibly attempting to predetermine the perforation's shapes and spacings when bent, would be impractical in view of fabricating tolerances.

BRIEF DESCRIPTION

The Rack Processor is configured to produce perforations in a rack while the rack is bent corresponding to its being bent when used. The processor may be attached to a workbench, rack perforations may be produced, and the rack may then be used as the linear element in a drive system for "interconverting" linear and rotary motions.

BRIEF DESCRIPTION VIEWS

FIG. 1 is a plan view of the Rack Processor shown containing a rack being processed.

FIG. 2 is a section view, taken from FIG. 1, showing a method for reducing tolerances from linear spacing of rack perforations.

FIG. 3 is a section view, taken from FIG. 1, showing the mechanics to adjust the flattened width of the rack.

FIG. 4 is a section view, taken from FIG. 1, illustrating manner with which the rack is aligned and perforated.

DETAILED DESCRIPTION AND SPECIFICATION

A top view of Rack Processor 544 may be seen with FIG. 1. It is used to produce perforations in a coilable rack. Incorporated are a lower die 546 and upper die 548. The dies sandwich, in a flattened manner, the rack's cross-sectionally curved stock material inserted therebetween and shown emerging, perforated, as rack 549. Also incorporated are: A U-shaped guide 50 attached with dowel pins 552 to the upper die; a U-shaped guide 554 made adjustable with socket head screws 556 threaded to the upper die; two die aligning taper pins 558; two die fastening socket head screws 560; two die separating socket head screws 62; two punches 564 and 566; and a pivot pin 568 pivotable about axis 570 with a punch striking assembly (not shown in FIG. 1) that is rocked back and forth parallel with axis 572. The four holes 574 are to mount the processor upon an appropriate surface.

The upper die is machined along the bottom length with a convex cut having a radius equal with that of a circular coupling about which rack 549 when used will be bent. The lower die is machined along the top length with a concave cut having the same radius as the upper die plus the thickness of rack 549. The dies, guides, punches and stop pin and cam body (to be explained) are all fabricated from tool steel and hardened to the hardness of the taper pins and pivot pin (dowel pins).

Two U shaped guides 550 and 554 align the rack's stock material milled die straight and usually hot rolled. Because minor width discrepancies may exist with batches of rack material that are milled, U shaped guide 554 may be adjusted so each of the material's edges slides along a guide. In this manner, the material is guided longitudinally and the guides are arranged so the material will not slide through them unless its width is consistent and its sides straight.

FIG. 2 is a sectional view showing the arrangement for a stop pin 576. The pin is positioned, generally, in the lower die and extends into a recess provided in the upper die thereby preventing the pin from becoming damaged. When perforations are made by the punches and the rack is advanced, the hole previously made is placed around the pin with the hole's edge abutted against it. Although stop pin 576 is press fitted, set screw 578 assures consistent positioning of the pin. The angle 580 between the centerline of punch 564 and that of the stop pin corresponds with 360 degrees divided by the number of sprockets on the sprocket wheel with which rack 549 will be used.

Because of fabricating tolerances, it is noted that the angle described cannot be duplicated realistically (the pitch of sprockets on a sprocket wheel). Since every fabricating operation contains an individual tolerance, each pitch on a sprocket wheel is finitely different in length. Therefore, the angle described although correct mathematically is theoretical and would depend upon no tolerance fabricating that of course is impossible in reality.

If for example rack 549 will eventually be displaced 3.60 inches per revolution of a sprocket wheel, the 3.60 inches would contain 18 perforations if the sprocket wheel contained 18 sprockets in a row. With that example the distance between hole centerlines would be 0.20 inch (3.60 inches divided by 18 holes). If the overall length of rack 30 is 8 feet (96.00 inches), the number of perforations in one row along a 96.00 inch rack would be 480 holes (96.00 inches divided by 0.20 inch).

With a rack such as explained, 480 holes can be processed whereby no build-up of tolerances for practical purposes will exist between the first and last of the 480 holes consecutively punched. This is accomplished with stop pin 576 being removable and having a smaller tip as shown. The distance between perforations is adjusted by removing the pin and honing, lapping and polishing its hardened radial abutment surface. This procedure is continued until when the pin is used, the first and last of the total perforations exhibit no elongation or tolerance when worn with the sprockets that will eventually be used. Of course, the measuring process of interferometry may be used to establish and verify such measurements. Usually, longer lengths are perforated. With no-tolerance fits in the longer lengths, the racks are cut into lengths required with no-tolerance fits then being assured.

Different stop pins may be used with rack processor 544. The various pins being adjusted for the various surface finish combinations (paint) on the rack. For example, at times electrical conductors are embedded within the finishes, therefore, an additional finish is required. Although each finish usually requires only about 0.0005 inch more thickness per side, the thickness is significant when processing the perforations to match the pitch of sprockets.

FIG. 3 is a sectional view showing how U-shaped guide 554 is slid along the upper die and adjusted against the side of the material to be perforated. The upper and lower dies are machined with stepped, convex and concave cuts allowing the guides to abut the sides of the rack material thereby assuring the material will not slip under the guides. Also, when U shaped guide 554 is slid against the material and screws 556 are tightened, because of the semicircular sliding surface the abutting edge of the guide will always remain perpendicular to the surface against which it is slid.

FIG. 4 shows an alignment of the Rack Processor's components whereby their operational characteristics may be visualized. The top central portion of upper die 548 is machined with a structure supporting the punch striking assembly indicated with the numeral 582, and also machined with two bifurcations supporting the punches 564 and 566. Each punch is ring fitted with in-line holes vertically bored through upper die 548, and the punches are machined with ring grooves to fit with retaining rings 584. Compression springs 586 are placed within the bifurcations, the punches are inserted through the bifurcations, and retaining rings 584 are then snapped into the ring grooves. Each time a punch is depressed and released it is returned by the pushing force of the spring.

Cam body 588 contains a bifurcation (only one side shown because of the sectional view) the branches of which extend on each side of the uppermost structural portion of upper die 548 machined with a hole to accept pivot pin 568. The bifurcation bracketed branches are machined with in-line matching holes. Pivot pin 568 is inserted therethrough and retained with screw 590. Striking assembly 582 is then pivotable about the axis of pivot pin 568 to strike and depress the punches to a depth made adjustable by stop screws 592 locked with locking nuts 594 and pivoting on a line indicated with the numeral 598.

Each punch is tapered at its lower extremity and ring fitted with an in-line hole bored in lower die 546. The punch receiving hole in lower die 546 is opened to receive the material punched out of the perforations. The concave cut 600 in lower die 546 permits wires embedded within the rack finishes to pass therethrough.

Now glancing at FIGS. 1, 2, 3 and 4, it may be visualized how rack 549 is processed. With upper die 548 removed, the material is radially bent usually toward its normally convex side around the convex surface of the upper die. The edges of the material are abutted with the U-shaped guides by adjusting guide 554. The material, upper die and guides are oiled for lubricity, and the material's length is slid between the guides assuring a snug, sliding fit. It is also assured that the edges of the material are straight and its width is consistent.

The upper and lower dies are loosely connected with screws 560 leaving a space permitting the material to be slid between the dies. Using wire snippers or a small punch or the like, a V-cut or any appropriate hole is made into the material and the cut or hole is placed around stop pin 576. The dies are closed using taper pins 558 for positioning and held closed with screws 560 being tightened. The material is punched by alternately rocking back and forth handle 596 stopped by screws 592 adjusted to permit each punch to slightly penetrate into the lower die.

Die fastening screws 560 are then unthreaded and the dies are separated. Experience has taught that mounting the rack processor upon a surface having cutouts, whereby the bottom of the taper pins 558 may gently be tapped, is best to effectively release the pins, in turn, separating the dies. In this manner, any wear in the surfaces where the pins and dies contact will be distributed evenly and the pins will always locate the dies to be closed in the same position. The die separating screws 562 are then threaded into the upper die and against the lower die thereby separating them sufficiently to lift rack 549 from pin 576. The hole previously punched is placed around the pin and its edge abutted against the pin. The dies are again fastened and consecutive holes are punched with the process explained.

As outlined in this specification, if desired only one row of perforations may be processed by using only one punch. Also, it may be visualized that cam body 588 may be fabricated to strike multiple punches arranged within the punch holding structure of the upper die. Also, similar rack processors may be produced having punches separated by various distances and stop pins set at various degrees thereby making possible any combination of perforations within the rack. In addition, although the perforations shown here are circular, the Rack Processor may be machined to produce various shaped perforations such as square, rectangular, oblong and more.

It is also obvious that the concave cut 600 may be, as well, a concave cut machined in upper die 548. Although the processing of rack 549 is preferred as described, the rack may be processed while being bent radially toward its concave surface. If processed as such, the resulting slight taper of the perforations, caused by the reverse bend, will disappear with the wearing of the holes when mated with the sprockets.

I claim:
1. A rack processor comprising:
a cross-sectionally curved tape being radially bent to
a predetermined radius causing the tape in the bend to have concave and convex laterally flattened surfaces;

a first die having concave surface means for matching the tape's radially bent and laterally flattened convex surface, and a second die having convex surface means for matching the tape's radially bent and laterally flattened concave surface;

fixed and adjustable U-shaped guides having semicircular abutting edges for maintaining perpendicularity of the tape;

tapered means for aligning the dies;

means for fastening said concave and convex surface means of said first and second dies;

means extending between the dies for separating the dies;

at least one tapered punch for penetrating the dies and punching perforations in the tape;

a stop pin embedded in one of the dies and adjustable to a circular pitch of sprockets with which the tape will be used; and a pivotable punch striking assembly containing means for adjusting a depressable depth of said at least one tapered punch.

2. The rack processor of claim 1, wherein the tape includes electrical wires attached thereon, and wherein one of the dies contains cutout means for allowing the wires, with the dies fastened, to unobstructively pass through said cutout means.

* * * * *